(No Model.)
C. V. PLEUKHARP.
CASTER POD.
No. 359,362. Patented Mar. 15, 1887.
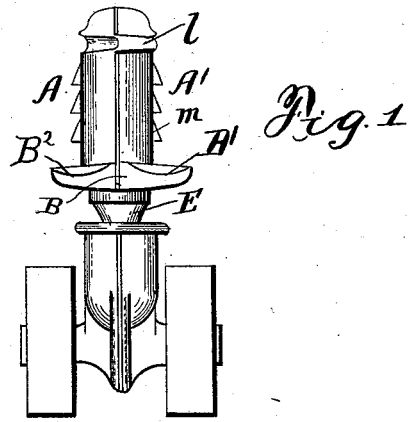
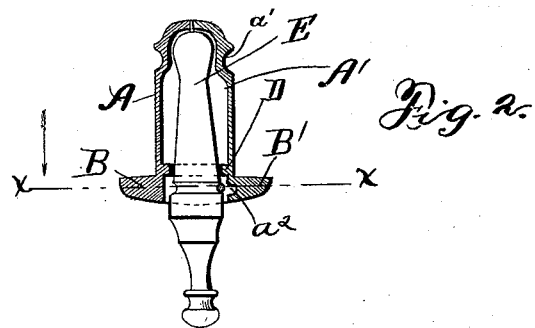
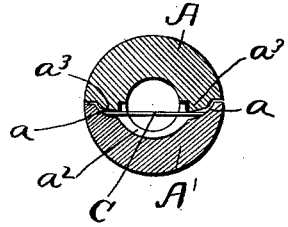
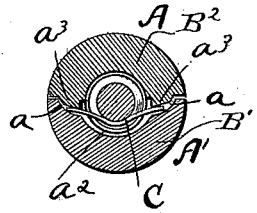
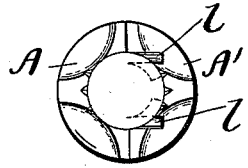
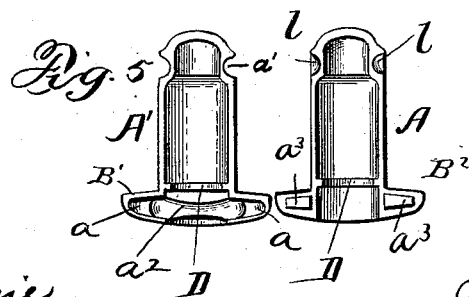
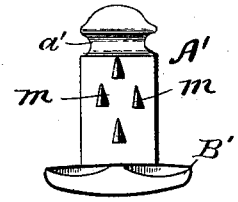
Witnesses
T. C. Laurie
Mortimer Redman
Inventor
Charles V. Pleukharp
By his Attorneys
R. S. & A. P. Lacey

UNITED STATES PATENT OFFICE.

CHARLES V. PLEUKHARP, OF COLUMBUS, OHIO.

CASTER-POD.

SPECIFICATION forming part of Letters Patent No. 359,362, dated March 15, 1887.

Application filed November 13, 1886. Serial No. 218,791. (No model.)

*To all whom it may concern:*

Be it known that I, CHARLES V. PLEUK-HARP, a citizen of the United States, residing at Columbus, in the county of Franklin and State of Ohio, have invented certain new and useful Improvements in Caster-Pods; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a caster-pod which is made in two parts, so that each can be cast separately, and when put together will form the socket for the reception of the shank of the caster.

The invention relates particularly to that class of caster-pods which lock the shank therein and prevent the accidental displacement of the caster in case the article to which it is applied is elevated a distance from the floor greater than the length of the caster-shank.

The object of the improvement is the construction of a pod of the above-described type, by which the parts can be quickly fastened together, and by which the shank-locking spring can be readily inserted in position and positively held in place.

Another object is to devise means for locking the pod in place when inserted in the article to which it is desired to apply the caster.

The improvement consists in the novel features presently to be described and claimed.

In the drawings, Figure 1 is a side view of the caster-pod having a caster applied thereto. Fig. 2 is a central longitudinal section through both parts of the pod, showing the upper portion of the caster-shank in full. Fig. 3 is a sectional view on the line X X of Fig. 2. Fig. 4 is a view similar to Fig. 3, having the shank removed. Fig. 5 is a plan view of the parts of the pod separated. Fig. 6 is a top view showing the manner of locking the parts together, and Fig. 7 is a front view of the pod.

The pod comprises the parts A and A', made of suitable malleable metal. The shank-receiving socket is formed part way in each casting, and is reduced preferably at its inner end, so that the pod, or at least the part A' thereof, can have the exterior groove, $a'$, opposite the reduced portion of the socket, and the pod present a nearly uniform diameter throughout its length back of the flange B, which flange is adapted to form a rest and limit the movement of the pod. The part A' has the spring-receiving groove or recess $a^2$ formed in the flanged end B' thereof. The groove deepens near each end of the flange, forming the shoulders $a$, between which and the lugs $a^3$ near each end of the flange $B^2$ of the part A the spring C is held. The groove narrows toward its bottom, being widest at its commencement. The lugs $a^3$ are wedge-shaped and have their inner ends wider, so as to more readily conform to the slope of the shoulders $a$ and hold the spring C more firmly in place. The annular rib D, extending inward from the sides of the socket, together with the reduced end, form bearings for the shank E, and the rib prevents the crowding of the spring.

The spring is preferably made of steel wire of sufficient strength merely to hold the caster in place. This wire needs but to be cut the proper length and placed in position. No bending, stamping, or swaging is necessary.

The part A is provided with the securing-lugs $l$, which project from each edge at a point corresponding with the groove $a'$ in the part A', into which they are adapted to be bent when securing the parts together. When seated in the groove, the lugs come flush with the exterior of the pod, so as not to offer any resistance to the insertion of the pod into the socket. The securing-lugs, together with the spring-fastening lugs, guide the parts A and A' when put together and prevent displacement thereof in any direction.

In practice the parts A and A' are cast separately, and all that is necessary to make a complete pod, ready for use, is to insert the spring in the groove or recess $a^2$, with its ends resting upon the shoulders $a$, put the two halves together, and bend the securing-lugs $l$ down into the groove $a'$. The securing-lugs can be bent quickly, cheaply, and simultaneously by a punch having a V-shaped end.

The pod is intended to be used in connection with any caster, provided it has an annular groove to receive the spring which locks it in place. The spring extends across the mouth of the shank-receiving socket and is deflected to one side when the shank is inserted, and exerts sufficient force to keep in the groove of the shank.

The flange at the bottom of the pod, in which the spring-receiving groove is formed, furnishes a smooth surface when the caster is removed, and thus prevents the marring of floors, tearing of carpets, and splintering of legs or posts.

The pod is provided with locking-spurs $m$, which increase in width and thickness as they recede from the top and approach the flanged end. They terminate abruptly and form a square shoulder. By reason of their peculiar shape the spurs divide the fibers of the wood and push them gently to one side, and as they are set staggering the fibers are assisted in returning to their original position by the spurs following in the wake of the advanced spurs and located to one side of their path. The fibers close in behind the square shoulders of the spurs and prevent, in a measure, the withdrawing of the pod after once driven home.

Having thus described my invention, what I claim, and desire to secure by Letters Patent, is—

1. A caster-pod made in halves and secured together, and having a spring arranged close to the mouth of the socket and clamped between the halves, substantially as and for the purpose described.

2. A two-part caster-pod having its lower end flanged, one part having a spring-receiving groove in the flange, forming shoulders at each end thereof, and the other part having spring-retaining lugs to act in opposition to shoulders, as and for the purpose described.

3. The two-part caster-pod having a flange at its lower end, one part having a spring-receiving groove or recess in its flange, forming sloping shoulders at each end thereof, and the other part having wedge-shaped lugs projected from each end of the flange to act in opposition to the shoulders, substantially as and for the purpose set forth.

4. The two-part caster-pod having a flanged end and provided on its interior with an annular rib or bearing above the flange, and having a spring-receiving recess or groove formed in the flange, substantially as described.

5. A two-part caster-pod having securing-lugs projecting from the one part and adapted to embrace the other part, substantially as and for the purpose described.

6. A two-part caster-pod having a groove formed on the one part and securing-lugs projecting from the other part, and adapted to be bent into said groove and lock the parts together.

7. The two-part caster-pod having its lower end flanged, one part having a spring-receiving groove in its flange, forming shoulders at each end thereof, the other part having lugs extended from each end of the flange, and securing-lugs projected from one part and adapted to embrace the other part and hold both parts together.

In testimony whereof I affix my signature in presence of two witness.

CHARLES V. PLEUKHARP.

Witnesses:
M. L. MILLIGAN,
E. C. IRVINE.